(12) United States Patent
Lamine et al.

(10) Patent No.: US 9,274,396 B2
(45) Date of Patent: Mar. 1, 2016

(54) ELECTROCHEMICAL DEVICE HAVING ELECTRICALLY CONTROLLABLE OPTICAL AND/OR ENERGY TRANSMISSION PROPERTIES

(75) Inventors: Driss Lamine, Paris (FR); Arnaud Verger, Paris (FR); Samuel Dubrenat, Paris (FR); Emmanuel Valentin, Le Plessis Trevise (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 92 days.

(21) Appl. No.: 13/992,127

(22) PCT Filed: Dec. 5, 2011

(86) PCT No.: PCT/FR2011/052871
§ 371 (c)(1),
(2), (4) Date: Aug. 19, 2013

(87) PCT Pub. No.: WO2012/076800
PCT Pub. Date: Jun. 14, 2012

(65) Prior Publication Data
US 2013/0329273 A1    Dec. 12, 2013

(30) Foreign Application Priority Data
Dec. 6, 2010 (FR) .................................... 10 60154

(51) Int. Cl.
*G02F 1/153* (2006.01)
*G02F 1/155* (2006.01)
*G02F 1/15* (2006.01)

(52) U.S. Cl.
CPC .............. *G02F 1/155* (2013.01); *G02F 1/1523* (2013.01); *G02F 2203/11* (2013.01)

(58) Field of Classification Search
CPC ...................................................... G02F 1/163
USPC ............................................................ 359/275
See application file for complete search history.

(56) References Cited

U.S. PATENT DOCUMENTS

| 5,985,486 A | 11/1999 | Giron |
| 6,193,912 B1 | 2/2001 | Thieste et al. |

(Continued)

FOREIGN PATENT DOCUMENTS

| EP | 0 831 360 | 3/1998 |
| JP | 11-293228 A | 10/1999 |

(Continued)

OTHER PUBLICATIONS

Ding, F. et al., "Electrochromic Properties of ZnO Thin Films Prepared by Pulsed Laser Deposition", Electrochemical and Solid-State Letters, vol. 2, No. 8, pp. 418 to 419, (1999), XP-000864985.

(Continued)

*Primary Examiner* — James Jones
(74) *Attorney, Agent, or Firm* — Oblon, McClelland, Maier & Neustadt, L.L.P.

(57) ABSTRACT

The invention relates to an electrochemical device (1) having electrically controllable optical and/or energy transmission properties, of the type comprising two electrode coatings (4, 6) and, between them, an electrochemically active layer (6) made of an inorganic material capable of reversibly switching between two states having different optical and/or energy transmission properties by the insertion and extraction of ions. An electrolyte (8) is present between the electrochemically active layer and the second electrode coating. The material of the electrochemically active layer is a material, the insertion and extraction of the ions of which during switching between the two states correspond to a variation in the plasma wavelength $\lambda$ of the material and in that the material has, at the plasma wavelength $\lambda$, a full width at half maximum $\Delta\lambda$ of the absorption spectrum equal to or less than 1 micron in the two states.

20 Claims, 1 Drawing Sheet

(56) References Cited

U.S. PATENT DOCUMENTS

| | | | |
|---|---|---|---|
| 2004/0146786 A1* | 7/2004 | Sato et al. | 429/326 |
| 2011/0299149 A1 | 12/2011 | Park et al. | |
| 2013/0329273 A1* | 12/2013 | Lamine et al. | 359/275 |

FOREIGN PATENT DOCUMENTS

| | | |
|---|---|---|
| JP | 2009-545765 A | 12/2009 |
| KR | 2010 0050431 | 5/2010 |
| WO | 99 45081 | 9/1999 |
| WO | WO 2010/053299 A2 | 5/2010 |

OTHER PUBLICATIONS

International Search Report Issued Feb. 10, 2012 in PCT/FR11/52871 Filed Dec. 5, 2011.

U.S. Appl. No. 13,992,162, filed Jun. 6, 2013, Verger, et al.

Notice of Reasons for Rejection issued Jun. 23, 2015 in Japanese Patent Application No. 2013-542587 (English language translation only).

Office Action mailed Sep. 25, 2015, in European Patent Application No. 11 805 097.0.

Zheng-Wen Fu et al. "The Electrochemical Reaction of Zinc Oxide Thin Films with Lithium" Journal of the Electrochemical Society, vol. 150, No. 6, Published Jan. 1, 2003, p. A714.

* cited by examiner

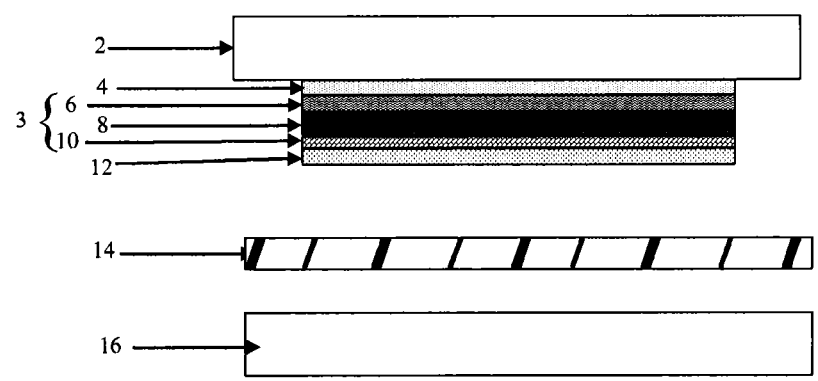

ELECTROCHEMICAL DEVICE HAVING ELECTRICALLY CONTROLLABLE OPTICAL AND/OR ENERGY TRANSMISSION PROPERTIES

CROSS REFERENCE TO RELATED APPLICATIONS

The present application is a 35 U.S.C. §371 national stage patent application of International patent application PCT/FR2011/052871, filed on Dec. 5, 2011, published as WO 2012/076800 on Jun. 14, 2012, the text of which is incorporated by reference, and claims the benefit of the filing date of French application no. 1060154, filed on Dec. 6, 2010, the text of which is also incorporated by reference.

The present invention relates to the field of thermal regulation through glazing.

Transparent glazing called "solar-control" glazing exists that consists in providing it with a layer (for example produced by means of a multilayer stack of dielectric and metal layers) having a high reflectivity in the wavelength range between 0.8 and 2 µm, as described for example in U.S. Pat. No. 6,042,934. However, such glazing has the drawback of not enabling the reflectivity to be varied. Although such glazing does limit the heating of buildings in summer, when there is strong sunshine and a high external temperature, it has a low energy transmission factor (i.e. the factor g), which is a drawback in winter when there is little sunshine and the external temperatures are low.

Other existing solutions, known as "low-emissivity or low-E" glazing, use a material having a high reflection in the mid infrared and far infrared, but a lower reflection in the near infrared (for example again using a multilayer stack of dielectric and metal layers) as described in EP 0 611 213. This glazing has better performance because it prevents radiative heat losses and therefore enhances the insulation, but it has the same drawbacks as the "solar-control" glazing.

To alleviate these drawbacks, the invention is aimed more particularly at the field of electrochemical devices having electrically controllable optical and/or energy transmission properties, more particularly devices comprising a layer of electrochemically active material having an optical absorption or reflection that can be controllably and reversibly modified by the insertion and extraction of ions.

The optical field in question is for example the visible range (between 0.4 and 0.8 µm) and/or the infrared range (between 0.8 and 1000 µm).

There are devices that act in the visible range, called "electrochromic" devices, as described for example in U.S. Pat. No. 6,747,779.

These devices are useful for preventing glare and, when they are incorporated into glazing, for regulating the heat influx through the glazing.

However, to reduce the heat influx, it is necessary to reduce the light transmission.

One object of the invention is to provide an electrochemical device having electrically controllable optical and/or energy transmission properties that exhibits good thermal regulation and light transmission performance.

For this purpose, one subject of the present invention is an electrochemical device having electrically controllable optical and/or energy transmission properties, of the type comprising:
a first electrode coating;
a second electrode coating;
an electrochemically active layer formed on the first electrode coating and located between the first electrode coating and the second electrode coating, the electrochemically active layer being made of an inorganic material capable of reversibly switching between a first state and a second state having different optical and/or energy transmission properties by the insertion and extraction of ions; and
an electrolyte between the electrochemically active layer and the second electrode coating, in which the material of the electrochemically active layer is a material, the insertion and extraction of the ions of which during switching between the first state and the second state correspond to a variation in the plasma wavelength $\lambda$ of the material and in that the material has, at the plasma wavelength $\lambda$, a full width at half maximum $\Delta\lambda$ of the absorption spectrum equal to or less than 1 micron in the first state and in the second state.

With such a material, insertion of the ions leads to a significant increase in the number of free charge carriers and thus to a relatively large shift in the plasma wavelength of the material. The plasma wavelength shift is sufficient to cut off the near infrared range.

It is thus possible to control the reflection factor of the material in the near infrared by a shift in the plasma wavelength thereof.

Furthermore, such a material maintains good transparency in the visible range, that is to say a light transmission factor $D_{65}$ of at least 50%, thereby making it possible to control the energy transmission without appreciably impairing the illumination in the building.

It should be noted that, throughout the text, the expression "light transmission factor of a material" is understood to mean that part of the light transmitted through the material, that is to say that part of the light not absorbed by the material and not reflected at the two interfaces thereof.

Specifically, these devices are capable of controlling the optical transmission in the near infrared range while still having a relatively high transparency in the visible range (light transmission).

Such devices may of course have applications in many other fields, such as windows in automobiles, railroad vehicles, aircraft, etc., or in any device requiring the energy transmission to be controlled, while still remaining transparent in the visible range.

It should be noted, by way of illustration of the technological background, that FR-A-2 934 062 describes a material which is electrochemically active in a range between 3 and 5 µm (mid infrared).

Likewise, the article "Prospects for emissivity control using electrochromic structures" by Jeffrey S. Hale et al., in *Thin Solid Films* 339, 174-180 (199) describes electrochemical devices that act in a range between 2 and 14 µm (mid infrared).

However, the thermal regulation performance, which can be evaluated by the contrast in the solar control factor g between the two states of the device, remains limited (the solar factor g of the device corresponds to the total amount of energy transmitted through the device).

It should be noted that, in the case of $H_xWO_3$ known from the prior art, the insertion of ions (for example protons) creates one or more energy bands in the bandgap of the $WO_3$, causing light absorption in these energy levels. In contrast, in the device according to the invention, the insertion of an ion creates a charge carrier in the shallower levels of the bandgap or in the degenerate states with the conduction band of the semiconductor, thus creating free charge carriers participating in the electrical conduction of the material without creating additional absorption.

According to particular embodiments of the invention, the device according to the invention furthermore includes one or more of the following features, taken in isolation or in any technically possible combination:

- said material of the electrochemically active layer has, in the second state, a concentration of free charge carriers such that said material has an absorption spectrum satisfying the relationship $0.7\ \mu m \leq \lambda - \Delta\lambda/2 \leq 1.4\ \mu m$, preferably $0.7\ \mu m \leq \lambda - \Delta\lambda/2 \leq 0.9\ \mu m$;
- said material of the electrochemically active layer has, in the first state, a concentration of free charge carriers such that said material has an absorption spectrum satisfying the relationship $(\lambda - \Delta\lambda/2) \geq 1.5\ \mu m$, preferably $(\lambda - \Delta\lambda/2) \geq 1.8\ \mu m$ and more preferably $(\lambda - \Delta\lambda/2) \geq 2\ \mu m$;
- said material of the electrochemically active layer has, in the first state and in the second state, a light transmission $D_{65}$ equal to or greater than 50%, preferably equal to or greater than 70%;
- the switch from the first state to the second state corresponds to a reduction of said material;
- the inserted ions are cations;
- said material of the electrochemically active layer is based on a metal oxide;
- said material of the electrochemically active layer is based on $ZnO_x$, where x is between 0.5 and 1.5 and preferably x is between 0.8 and 1.2;
- said material of the electrochemically active layer is based on $ZnO_x$:M, where M is a dopant;
- the % content by weight of the dopant M in the compound $ZnO_x$:M is between 0.1 and 5%, preferably between 0.1 and 3%;
- the dopant M is selected from aluminum (Al), boron (B), gallium (Ga), germanium (Ge) and silicon (Si);
- the device comprises a second electrochemically active layer capable of reversibly inserting/extracting said ions, the insertion of the ions into the first electrochemically active layer corresponding to the extraction of the ions from the second electrochemically active layer, and vice versa, the electrolyte being between the first electrochemically active layer and the second electrochemically active layer;
- the device is of the all solid state type, the first electrode coating being formed on a substrate, the first electrochemically active layer being formed on the first electrode coating, the electrolyte being formed on the first electrochemically active layer, the second electrochemically active layer being formed on the electrolyte, and the second electrode coating being formed on the second electrochemically active layer; and
- the device includes a counter substrate and a lamination interlayer, the counter substrate and the substrate being laminated together by means of the lamination interlayer in such a way that the electrochemically active layer is located between the substrate and the counter substrate, the lamination interlayer preferably bringing in means for electrically connecting the second electrode coating.

The subject of the invention is also glazing comprising a device as described above.

A further subject of the invention is a process for manufacturing an electrochemical device having electrically controllable optical and/or energy transmission properties, comprising steps of:

- depositing an electrode coating on a substrate; and
- depositing, on the electrode coating, an inorganic electrochemically active layer capable of reversibly switching between a first state and a second state of different optical and/or energy transmission by the insertion and extraction of ions, in which the material of the electrochemically active layer is a material, the insertion and extraction of the ions of which during switching between the first state and the second state correspond to a variation in the plasma wavelength $\lambda$ of the material and in that the material has, at the plasma wavelength $\lambda$, a full width at half maximum $\Delta\lambda$ of the absorption spectrum equal to or less than 1 micron in the first state and in the second state.

According to particular embodiments of the invention, the process according to the invention furthermore has one or more of the following features, taken in isolation or in any technically possible combination:

- said material of the electrochemically active layer has, in the second state, a concentration of free charge carriers such that said material has an absorption spectrum satisfying the relationship $0.7\ \mu m \leq \lambda - \Delta\lambda/2 \leq 1.4\ \mu m$, preferably $0.7\ \mu m \leq \lambda - \Delta\lambda/2 \leq 0.9\ \mu m$;
- said material of the electrochemically active layer has, in the first state, a concentration of free charge carriers such that said material has an absorption spectrum satisfying the relationship $(\lambda - \Delta\lambda/2) \geq 1.5\ \mu m$, preferably $(\lambda - \Delta\lambda/2) \geq 1.8\ \mu m$ and more preferably $(\lambda - \Delta\lambda/2) \geq 2\ \mu m$;
- said material of the electrochemically active layer has, in the first state and in the second state, a light transmission $D_{65}$ equal to or greater than 50%, preferably equal to or greater than 70%;
- the switch from the first state to the second state corresponds to a reduction of said material;
- the inserted ions are cations;
- said material of the electrochemically active layer is based on a metal oxide;
- said material of the electrochemically active layer is based on $ZnO_x$, where x is between 0.5 and 1.5 and preferably x is between 0.8 and 1.2;
- said material of the electrochemically active layer is based on $ZnO_x$:M, where M is a dopant;
- the % content by weight of the dopant M in the compound $ZnO_x$:M is between 0.1 and 5%, preferably between 0.1 and 3%;
- the dopant M is selected from aluminum (Al), boron (B), gallium (Ga), germanium (Ge) and silicon (Si);
- said material is obtained by magnetron sputtering, for example from a zinc (Zn) target and a target of the dopant M in a reactive atmosphere containing oxygen;
- the process comprises a step of depositing a second electrochemically active layer capable of reversibly inserting/extracting said ions, the insertion of the ions into the first electrochemically active layer corresponding to the extraction of the ions from the second electrochemically active layer, and vice versa, the electrolyte being between the first electrochemically active layer and the second electrochemically active layer;
- the device is of the all solid state type, the first electrode coating being deposited on a substrate, the first electrochemically active layer being deposited on the first electrode coating, the electrolyte being deposited on the first electrochemically active layer, the second electrochemically active layer being deposited on the electrolyte, and the second electrode coating being deposited on the second electrochemically active layer; and
- the device includes a counter substrate and a lamination interlayer, the process comprising a step of laminating the counter substrate with the substrate by means of the lamination interlayer, the counter substrate being placed in such a way that the electrochemically active layer is located between the substrate and the counter substrate, the lamination interlayer preferably bringing in means for electrically connecting the second electrode coating.

The invention will be better understood on reading the following description, given solely by way of example, and with reference to the appended drawing in which FIG. 1 is a schematic cross-sectional view of an electrochemical device according to the invention.

The drawing is not to scale, for the sake of clear representation, since the differences in thickness between for example the substrate and the other layers are substantial, for example they differ by a factor of around 500.

The electrochemical device 1 illustrated comprises, in the following order:
- a substrate 2;
- a first electrode coating 4;
- a first electrochemically active layer 6 having electrically controllable optical and/or energy transmission properties;
- an electrolyte 8;
- a second electrochemically active ion storage layer 10, which is optional;
- a second electrode coating 12;
- a lamination interlayer 14, which is optional; and
- a counter substrate 16.

Throughout the text, the expression "electrode coating" is understood to mean a current-supplying coating comprising at least one electronically conductive layer, that is to say one in which the electrical conductivity is provided by the mobility of electrons, to be distinguished from an electrical conductivity resulting from the mobility of ions.

The device 1 illustrated is of the "all solid state" type, that is to say one in which the first electrode coating 4, the first electrochemically active layer 6, the electrolyte 8, the second electrode coating 12 and, where appropriate, the second electrochemically active layer 10 are solids, that is to say the layers have sufficient mechanical strength to all be deposited on one and the same substrate and to adhere thereto. The layers are formed one on top of the other. For this purpose, the layers of the functional system are for example inorganic layers or made of certain organic materials having sufficient mechanical strength, such as PEDOT.

It should be noted that, throughout the text, the expression "a layer A formed (or deposited) on a layer B" is understood to mean a layer A formed either directly on the layer B, and therefore in contact with the layer B, or formed on the layer B with the interposition of one or more layers between the layer A and the layer B.

However, in general the device 1 is of any suitable type and not necessarily of the all solid state type. It may for example be a hybrid electrochemical device, that is to say one in which the electrochemical layers are solid (inorganic or made of polymer material) and in which the electrolyte separating the electrochemical layers is based on an organic gel or solution.

To give an example, EP-0 253 713, EP-0 670 346, EP-0 382 623, EP-0 518 754 and EP-0 532 408 describe hybrid electrochemical devices.

In the case of a hybrid device, the second electrode coating 12 and the optional second electrochemical layer 10 are formed on the counter substrate 16.

The first electrochemically active layer 6 and the optional second electrochemically active layer 10 are capable of reversibly inserting ions.

The application of a first electric potential between the electrode coatings 4, 12 results in the insertion of ions, for example cations, especially ions such as $H^+$ or $Li^+$ or other alkali metal ions, into the first electrochemically active layer 6 and in the extraction of the same ions from the second electrochemically active layer 10.

The application of an electric potential of opposite sign leads to the extraction of the ions from the first electrochemically active layer 6 and to the insertion of the ions into the second electrochemically active layer 10.

The electrolyte 8 provides the mobility of the ions intended to be inserted/extracted and prevents the mobility of electrons. In the case of an all solid state device, the electrolyte 8 is for example formed from one or more inorganic layers deposited on the first electrochemically active layer 6.

As mentioned above, the material of the electrochemically active layer 6 is a material, the insertion and extraction of the ions of which during switching between the first state and the second state correspond to a variation in the plasma wavelength of the material, said material having, at the plasma wavelength, a full width at half maximum equal to or less than 1 micron in the first state and in the second state.

Such a layer makes it possible to vary the energy transmission through the glazing, especially the solar factor g, while still remaining transparent in the visible range.

Throughout the text, the expression "solar factor g of a material" is understood to mean that part of the solar radiation $S_\lambda$ transmitted through the material and that part of the solar radiation $S_\lambda$ absorbed by the material and re-emitted toward the interior (on the opposite side from the side on which the solar radiation is incident), the solar radiation $S_\lambda$ being incident on that side of the device intended to be placed facing the solar light.

Measurement of the solar factor g is well known and especially defined by the prEN 410 standard of 1997. The spectral distribution $S_\lambda$ is mentioned in that standard.

The plasma wavelength $\lambda$ of the material is, throughout the text, the wavelength corresponding to the maximum absorption of the solar radiation $S_\lambda$ through the material (see the prEN 410 standard of 1997) in the range above 700 nm.

The full width at half maximum $\Delta\lambda$ (or FWHM) is by definition the difference between the two extreme values of the independent variable for which the dependent variable is equal to one half of its maximum value, that is to say the distance in abscissa between the two points of the absorption spectrum on either side of the plasma wavelength that are closest to the plasma wavelength and for which the absorption is equal to 50% of the absorption at the plasma wavelength.

The first electrochemically active layer 6 has, in the first state and in the second state, a light transmission factor ($T_L$) $D_{65}$ equal to or greater than 50%.

Advantageously, the first electrochemically active layer 6 has:
- in the first state, a concentration of free charge carriers such that the material has an absorption spectrum satisfying the relationship:
  $(\lambda-\Delta\lambda/2)\geq 1.5$ µm, preferably $(\lambda-\Delta\lambda/2)\geq 1.8$ µm and more preferably $(\lambda-\Delta\lambda/2)\geq 2$ µm; and
- in the second state, a concentration of free charge carriers such that the material has an energy absorption spectrum satisfying the relationship: $0.7$ µm$\leq\lambda-\Delta\lambda/2\leq 1.4$ µm, preferably $0.7$ µm$\leq\lambda-\Delta\lambda/2\leq 0.9$ µm.

The first electrochemically active layer 6 is inorganic and is for example based on a metal oxide.

It should be noted that, throughout the text, the term "inorganic" is understood to mean a material which is not organic (and therefore does not contain both carbon and hydrogen) and is not a metallic or organometallic complex.

The first electrochemically active layer 6 is for example a material based on zinc oxide and preferably comprises, in the ion-extracted state, at least 50% of a zinc oxide, preferably at least 90% of a zinc oxide.

The zinc oxide used is for example $ZnO_x$ where x is between 0.5 and 1.5, preferably x being between 0.8 and 1.2.

The zinc-oxide-based material is for example doped with a dopant M, for example doped with aluminum (Al), boron (B), gallium (Ga), germanium (Ge) or silicon (Si).

A preferred material is $ZnO_x$:M where x is between 0.5 and 1.5, preferably x being between 0.8 and 1.2, and the % content by weight of the dopant M is between 0.1 and 5%, preferably between 0.1 and 3%.

The material is for example formed by magnetron sputtering from a zinc (Zn) target and a target of the dopant M, for example in a reactive atmosphere containing oxygen. The atmosphere in the deposition chamber furthermore contains for example a gas of the chemical element inserted in the form of ions into the first electrochemically active layer.

It should be noted that, in the case of the material described above, the first state corresponds to an oxidized state of the material, whereas the second state corresponds to a reduced state of the material.

The inserted ions are for example cations, for example hydrogen or lithium ions, or other alkali metal ions.

The electrode coatings 4, 12 are made of a material of any suitable type. They are for example made of ITO or $SnO_2$:F or else of a multilayer stack that includes a silver layer.

The electrode coatings 4, 12 comprise one or more electroconductive layers. In the case of a multilayer stack that includes a silver layer, the latter is for example protected by an ITO layer.

The first electrode coating 4 is for example deposited directly on the substrate 2. However, as a variant, the device 1 comprises an intermediate layer between the substrate 2 and the first electrode coating 4.

The first electrochemically active layer 6 is formed on the first electrode coating 4. In the example described, it is formed directly on the first electrode coating 4 and therefore in contact with the latter.

In the case of a "hybrid" electrochemical device, the second electrode coating 12 is formed on the counter substrate 16.

In the case of an "all solid state" electrochemical device (illustrated in FIG. 1), the second electrode coating 12 is formed directly on the electrolyte 8 or, where appropriate, on the second electrochemically active layer 10.

The second electrochemically active layer 10 is of any suitable type. It may for example be a layer based on $M_xA_yU_z$ where M is a transition metal, A is the ion used for the reversible insertion into the first electrochemically active layer 6 and U is a chalcogen, such as oxygen, sulfur or selenium.

The metal M is for example selected from Ce, Ir, Pd and Ni.

The second electrochemically active layer 10 is called an "ion storage layer" as it serves to store ions during the extraction of the same ions from the first electrochemically active layer 6 and to supply ions during the insertion of the same ions into the first layer 6.

When the device 1 does not contain such a layer 10, the ion storage role is played by the electrolyte 8. It should be noted that the electrolyte 8 is itself electrochemically neutral, that is to say it neither reduces nor oxidizes during the operation of the device.

The electrolyte 8 is made of a material of any suitable type.

In the case of an "all solid state" device, the electrolyte 8 is solid and formed by one or more inorganic layers.

The electrolyte 8 is for example a layer of hydrated tantalum oxide ($Ta_2O_5 \cdot nH_2O$).

As a variant, the electrolyte may for example be a layer of hydrated tungsten oxide ($WO_3 \cdot nH_2O$) or a multilayer stack of several alternating hydrated tungsten oxide and hydrated tantalum oxide layers. EP-A-0 867 752 describes an electrolyte of this type.

It may also be, as mentioned in EP-A-0 867 752, one or more hydrated metal oxides selected from tungsten oxide, niobium oxide, nickel oxide, tin oxide, bismuth oxide, titanium oxide, vanadium oxide and molybdenum oxide, and optionally containing an additive metal promoting the hydration, in the form of an additional metal such as titanium, tantalum or rhenium, or an alkali metal of the Na, Li or K type.

In general, the electrolyte 8 is suitable for ensuring the mobility of the abovementioned insertion ions and for preventing the flow of electrons.

In the case of a "hybrid" device, the electrolyte 8 is a gel or solution or polymer injected, deposited or inserted into a space defined between the substrate 2 and the counter substrate 16.

The electrolyte 8 is for example a proton conductive polymer or a lithium-ion conductive polymer. EP-A-0 253 713, EP-A-0 670 346, EP-A-0 382 623, EP-A-0 518 754 and EP-A-0 532 408 describe examples of such electrolytes.

The lamination interlayer 14 is a film consisting of a thermoplastic material suitable for providing the adhesion of the substrate 2 to the counter substrate 16. For example, it is made of PU (polyurethane).

A lamination interlayer 14 typically has a thickness between 0.38 mm and 5 mm, for example 0.76 mm.

The lamination interlayer 14 is not essential for protecting the electrochemically active layers and may be absent. The counter substrate 16 is then advantageously spaced away from the second electrochemically active layer 10 so as not to damage it, and is separated from the substrate by a layer of gas, for example argon.

The substrate 2 is a sheet having a glass function.

The sheet may be flat or curved and have any dimensions, especially at least one dimension greater than 1 meter.

Advantageously, it is a glass sheet.

The glass is preferably of the soda-lime-silica type, but other types of glass, such as borosilicate glass, may also be used. The glass may be clear or extra-clear, or else tinted, for example tinted blue, green, amber, bronze or gray.

The thickness of the glass sheet is typically between 0.5 and 19 mm, especially between 2 and 12 mm, for example between 4 and 8 mm. It may also be a glass film with a thickness equal to or greater than 50 μm (in this case, the EC stack and the TCO/TCC electrode coatings are deposited for example by a roll-to-roll process).

As a variant, the substrate 2 is made of a flexible transparent material, for example a plastic.

The counter substrate 16 is a sheet having a glass function.

The sheet may be flat or curved and have any dimensions, especially at least one dimension greater than 1 meter.

Advantageously, it is a glass sheet.

The glass is preferably of the soda-lime-silica type, but other types of glass, such as borosilicate glass, may also be used. The glass may be clear or extra-clear, or else tinted, for example tinted blue, green, amber, bronze or gray.

The thickness of the glass sheet is typically between 0.5 and 19 mm, especially between 2 and 12 mm, for example between 4 and 8 mm. It may also be a glass film with a thickness equal to or greater than 50 μm (in this case, the EC stack and the TCO/TCC electrode coatings are deposited for example by a roll-to-roll process).

As a variant, the counter substrate 16 is made of a flexible transparent material, for example a plastic.

The subject of the invention is also not only the device 1 described above but glazing comprising the device 1. The substrate 2 and the counter substrate 16 are then panes of the glazing. This may for example be flat glazing for buildings or curved glazing for automobiles.

The glazing is for example multiple glazing, that is to say consisting of several glazing panes spaced apart and separated by a gas or vacuum layer, one or more of the spaced-apart glazing panes being for example a laminated glazing pane.

Yet another subject of the invention is a process for manufacturing the device 1 described above.

The process comprises, in the case of an "all solid state" device, steps of:
- depositing the first electrode coating 4 on the substrate 2;
- depositing the first electrochemically active layer 6 on the first electrode coating 4;
- depositing the electrolyte 8 on the first electrochemically active layer 6;
- optionally depositing the second electrochemically active layer 10 on the electrolyte 8; and
- depositing the second electrode coating 12 on the electrolyte 8 and, where appropriate, on the second electrochemically active layer 10.

According to a variant of the process, in the case of a "hybrid" device, the process comprises steps of:
- depositing the first electrode coating 4 on the substrate 2;
- depositing the first electrochemically active layer 6 on the first electrode coating 4;
- depositing the second electrode coating 12 on the counter substrate 16; and
- inserting the electrolyte 8 into a space defined between the substrate 2 and the counter substrate 16.

Again in the case of a "hybrid" device, the process additionally includes a step of depositing the second electrochemically active layer 10 on the second electrode coating 12 or, as a variant, it does not include such a step in the absence of such a layer.

The invention claimed is:

1. An electrochemical device having electrically controllable optical and/or energy transmission properties, comprising:
   a first electrode coating;
   a second electrode coating;
   an electrochemically active layer formed on the first electrode coating and located between the first electrode coating and the second electrode coating, wherein the electrochemically active layer comprises an inorganic material capable of reversibly switching between a first state and a second state having different optical and/or energy transmission properties by the insertion and extraction of ions; and
   an electrolyte between the electrochemically active layer and the second electrode coating,
   wherein the material of the electrochemically active layer is a material, the insertion and extraction of the ions of which during switching between the first state and the second state correspond to a variation in the plasma wavelength $\lambda$, of the material and the material has, at the plasma wavelength $\lambda$, a full width at half maximum $\Delta\lambda$ of the absorption spectrum equal to or less than 1 micron in the first state and in the second state,
   wherein said material of the electrochemically active layer has, in the first state, a concentration of free charge carriers such that said material has an absorption spectrum satisfying the relationship $(\lambda-\Delta\lambda/2) \geq 1.5$ μm, and
   wherein said material of the electrochemically active layer has, in the second state, a concentration of free charge carriers such that said material has an absorption spectrum satisfying the relationship $0.7$ μm$\leq -\Delta\lambda/2 \leq 1.4$ μm.

2. The device of claim 1, wherein said material of the electrochemically active layer has, in the first state and in the second state, a light transmission $D_{65}$ equal to or greater than 50%.

3. The device of claim 1, wherein the switch from the first state to the second state corresponds to a reduction of said material.

4. The device of claim 1, wherein the inserted ions are cations.

5. The device of claim 1, wherein said material of the electrochemically active layer comprises a metal oxide.

6. The device of claim 5, wherein said material of the electrochemically active layer comprises $ZnO_x$, wherein x is from 0.5 to 1.5.

7. The device of claim 6, wherein said material of the electrochemically active layer comprises $ZnO_x$:M, wherein M is a dopant.

8. The device of claim 7, wherein the % content by weight of the dopant M in the compound $ZnO_x$:M is from 0.1 and 5%.

9. The device of claim 7 wherein the dopant M is aluminum (Al), boron (B), gallium (Ga), germanium (Ge), or silicon (Si).

10. The device of claim 1, further comprising a second electrochemically active layer capable of reversibly inserting/extracting said ions, the insertion of the ions into the first electrochemically active layer corresponding to the extraction of the ions from the second electrochemically active layer, and vice versa, wherein the electrolyte is between the first electrochemically active layer and the second electrochemically active layer.

11. The device of claim 10, the device is of the all solid state type, the first electrode coating is formed on a substrate, the first electrochemically active layer is formed on the first electrode coating, the electrolyte is formed on the first electrochemically active layer, the second electrochemically active layer is formed on the electrolyte, and the second electrode coating is formed on the second electrochemically active layer.

12. The device of claim 1, further comprising a counter substrate and a lamination interlayer, wherein the counter substrate and a substrate is laminated together with the lamination interlayer-such that the electrochemically active layer is located between the substrate and the counter substrate.

13. A glazing, comprising the device of claim 1.

14. A process for manufacturing an electrochemical device having electrically controllable optical and/or energy transmission properties, the process comprising:
   depositing an electrode coating on a substrate; and
   depositing, on the electrode coating, an inorganic electrochemically active layer capable of reversibly switching between a first state and a second state of different optical and/or energy transmission by the insertion and extraction of ions,
   wherein the material of the electrochemically active layer is a material, the insertion and extraction of the ions of which during switching between the first state and the second state correspond to a variation in the plasma wavelength $\lambda$, of the material and in that the material has, at the plasma wavelength $\lambda$, a full width at half maximum $\Delta\lambda$ of the absorption spectrum equal to or less than 1 micron in the first state and in the second state,
   wherein said material of the electrochemically active layer has, in the first state, a concentration of free charge carriers such that said material has an absorption spectrum satisfying the relationship $(\lambda-\Delta\lambda/2)\geq 1.5$ µm, and wherein said material of the electrochemically active layer has, in the second state, a concentration of free charge carriers such that said material has an absorption spectrum satisfying the relationship $0.7\ \mu m \leq \lambda-\Delta\lambda/2 \leq 1.4$ µm.

15. The device of claim 1, wherein said material of the electrochemically active layer has, in the second state, a concentration of free charge carriers such that said material has an absorption spectrum satisfying the relationship $0.7\ \mu m\leq\lambda-\Delta\lambda/2\leq 0.9$ µm.

16. The device of claim 1, wherein said material of the electrochemically active layer has, in the first state, a concentration of free charge carriers such that said material has an absorption spectrum satisfying the relationship $(\lambda-\Delta\lambda/2)\geq 1.8$ µm.

17. The device of claim 1, wherein said material of the electrochemically active layer has, in the first state, a concentration of free charge carriers such that said material has an absorption spectrum satisfying the relationship $(\lambda-\Delta\lambda/2)\geq 2$ µm.

18. The device of claim 1, wherein said material of the electrochemically active layer has, in the first state and in the second state, a light transmission $D_{65}$ equal to or greater than 70%.

19. The device of claim 5, wherein said material of the electrochemically active layer comprises $ZnO_x$, wherein x is from 0.8 to 1.2.

20. The device of claim 19, wherein said material of the electrochemically active layer comprises ZnOx:M and weight of dopant M is from 0.1 and 3%.

* * * * *